United States Patent
Benoit et al.

(10) Patent No.: US 8,177,497 B2
(45) Date of Patent: May 15, 2012

(54) JOINT BETWEEN A METAL PART AND A CERAMIC PART BASED SIC AND/OR C

(75) Inventors: Joel Michel Daniel Benoit, Cesson la Foret (FR); Jean-Francois Fromentin, Cesson la Foret (FR); Valerie Chaumat, Saint Paul de Varces (FR); Olivier Gillia, Sassenage (FR); Nikolas Eustathopoulos, Grenoble (FR); Fiqiri Hodaj, Grenoble (FR); Alexey Koltsov, Moscou (RU)

(73) Assignees: SNECMA, Paris (FR); Commisariat a l'Energie Atomique, Paris (FR); Institut National Polytechnique de Grenoble, Grenoble (FR)

( * ) Notice: Subject to any disclaimer, the term of this patent is extended or adjusted under 35 U.S.C. 154(b) by 1010 days.

(21) Appl. No.: 12/096,663

(22) PCT Filed: Dec. 8, 2006

(86) PCT No.: PCT/FR2006/051318
§ 371 (c)(1),
(2), (4) Date: Jun. 9, 2008

(87) PCT Pub. No.: WO2007/066052
PCT Pub. Date: Jun. 14, 2007

(65) Prior Publication Data
US 2008/0304959 A1 Dec. 11, 2008

(30) Foreign Application Priority Data
Dec. 8, 2005 (FR) ...................................... 05 53790

(51) Int. Cl.
*F01D 25/24* (2006.01)
(52) U.S. Cl. ................. 415/200; 416/241 R; 416/241 B; 416/244 R

(58) Field of Classification Search .................. 415/200; 416/241 R, 241 B, 244 R
See application file for complete search history.

(56) References Cited

U.S. PATENT DOCUMENTS
3,813,759 A  6/1974  Heap et al.
(Continued)

FOREIGN PATENT DOCUMENTS
| EP | 1 028 476 | 8/2000 |
|---|---|---|
| EP | 1 479 656 | 11/2004 |
| FR | 2 806 405 | 9/2001 |
| JP | 07149578 | 6/1995 |
| JP | 2002 043482 | 2/2002 |
| WO | 01 68560 | 9/2001 |

OTHER PUBLICATIONS

Office Action issued Nov. 29, 2010 in Russia Application No. 2008127506, filed Dec. 8, 2006 (With English Translation).

(Continued)

*Primary Examiner* — Igor Kershteyn
(74) *Attorney, Agent, or Firm* — Oblon, Spivak, McClelland, Maier & Neustadt, L.L.P.

(57) ABSTRACT

An assembly between a metal piece and a ceramic material piece made of SiC and/or C based ceramic material. The assembly includes a stack structure including the following elements assembled together in pairs in this order, by brazing: the metal piece; a first intermediate piece; a second intermediate piece; and the ceramic material piece. The second intermediate piece is made of another ceramic material, that is chemically less reactive relative to metals than are SiC or C, and that presents a coefficient of expansion smaller than that of the material constituting the metal piece. The first intermediate piece is made of metal and can deform to compensate for expansion difference between the metal piece and the second intermediate piece. The assembly can be used in a turbomachine.

24 Claims, 2 Drawing Sheets

U.S. PATENT DOCUMENTS

| | | | |
|---|---|---|---|
| 4,723,862 | A | 2/1988 | Ito et al. |
| 5,447,683 | A | 9/1995 | Montgomery et al. |
| 5,501,390 | A | 3/1996 | Allen et al. |
| 5,836,505 | A | 11/1998 | Chaumat et al. |
| 6,655,695 | B1 * | 12/2003 | Sund et al. .................. 277/404 |
| 6,835,496 | B1 | 12/2004 | Kaminaka et al. |
| 2003/0038166 | A1 | 2/2003 | Gasse |
| 2004/0191558 | A1 | 9/2004 | Ishikawa et al. |
| 2004/0234784 | A1 | 11/2004 | Eaton et al. |

OTHER PUBLICATIONS

U.S. Appl. No. 12/096,714, filed Jun. 9, 2008, Benoit, et al.
U.S. Appl. No. 12/096,489, filed Jun. 6, 2008, Benoit, et al.
Pinguet, N. et al., "Structural chemistry, magnetism and electrical properties of binary Pr-silicides", Journal of Alloys and Compounds, Elsevier, vol. 348, pp. 1-11, XP004396782, (2003).
Boutarek, N. et al., "Metallurgical and physical study of praseodymium disilicides and digermanides" Journal of Alloys and Compounds, vol. 204, pp. 251-260, XP-002468135, (1994).
Meschel, S.V. et al., Standard enthalpies of formation of some carbides, silicides, germanides and borides of holmium by high temperature direct synthesis calorimetry, Journal of Alloys and Compounds, vol. 247, No. 1-2, pp. 52-56, XP 004049800, (1997).
Meschel, S.V. et al., Standard enthalpies of formation of some carbides, silicides, germanides and stannides of samarium by high temperature direct synthesis calorimetry, Journal of Alloys and Compounds, vol. 243, pp. 186-193, XP004049800, (1996).

* cited by examiner

JOINT BETWEEN A METAL PART AND A CERAMIC PART BASED SIC AND/OR C

BACKGROUND OF THE INVENTION

1. Field of the Invention

The invention relates to an assembly between a metal piece and a piece made of a ceramic material based on silicon carbide (SiC) and/or on carbon (C).

2. Description of the Related Art

The invention finds a preferred application in the field of aviation, for assembling a piece made of a refractory metal alloy such as an alloy based on nickel (Ni) or on cobalt (Co), and a piece made of a ceramic matrix composite material, i.e. a CMC piece. More particularly, the CMC pieces concerned comprise a matrix based on SiC, on C, or a composite matrix of C and SiC, reinforced with fibers of SiC and/or of C. Said matrix may be a single phase matrix (e.g. entirely made of SiC), or a multiphase matrix (for example it may contain at least one other phase having self-healing properties, as described in document FR 2 732 338).

CMC pieces are used in airplane turbojets to replace mechanical pieces that are the most exposed thermo-mechanically speaking, since CMC pieces retain good mechanical properties at high temperatures, thereby requiring less cooling, and they are generally lighter in weight.

Nevertheless, a problem arises in fastening such pieces of ceramic material to the metal pieces that surround them.

Amongst the assembly techniques used at present, there can be found conventional mechanical assembly of the riveting or bolting type. That type of assembly is often found to be unsuitable for reasons of bulk, of weight, and/or of poor dynamic behavior.

Assembly techniques are also known that use brazing for assembling together two pieces of ceramic material. Nevertheless, those techniques are difficult to use for brazing together a piece made of ceramic material and a metal piece, because of the very different thermo-mechanical and physico-chemical behaviors of ceramic and metal materials. In particular, there is a difficulty of a very great difference in thermal expansion between the pieces in question.

The expansion coefficient of a metal alloy is often two to five times greater than that of a coefficient of the ceramic materials used. Thus, during cooling, after the brazing composition has been melted, the relative shrinkage of the metal piece gives rise to a zone that is in compression and a zone that is in traction, respectively in a zone that is adjacent to the joint between the brazing composition and the ceramic material piece, and in a zone that is adjacent to the joint between the brazing composition and the metal piece. This causes the resulting assembly to bend, giving rise to stresses that can cause one of the pieces to break, generally the ceramic material piece since it is the more fragile, and to poor behavior of the brazed joint because of its localized deformation.

In addition, because of the high reactivity between C or SiC and metals (and more particularly transition metals), it is generally found that fragile chemical compounds of the carbide or silica type are formed between the ceramic and metal pieces. These fragile compounds weaken the assembly.

BRIEF SUMMARY OF THE INVENTION

An object of the invention is to mitigate those drawbacks, or at least to attenuate them, by proposing an assembly that makes it possible firstly to compensate for the difference in expansion between the metal piece and the piece made of ceramic material based on SiC and/or C, and secondly to avoid or to limit the formation of undesirable chemical compounds.

This object is achieved by an assembly of the invention comprising a stack structure made up of the following elements assembled together in pairs and in this order, by brazing:

said metal piece;
a first intermediate piece;
a second intermediate piece; and
said piece made of ceramic material based on SiC and/or on C, said assembly being such that:
the second intermediate piece is made of another ceramic material (i.e. a ceramic material different from that of said piece made of ceramic material), said other ceramic material being chemically less reactive with metals than are SiC or C, and presenting a coefficient of expansion that is smaller than that of the material constituting said metal piece; and
the first intermediate piece is made of metal and is suitable for deforming to compensate for the expansion difference between said metal piece and the second intermediate piece.

It should be observed that said ceramic piece may be a piece of solid SiC or a CMC piece of the above-described type.

The invention thus proposes interposing between the ceramic and metal pieces two intermediate pieces that have distinct functions.

The first intermediate piece makes it possible, by deforming, to compensate for the expansion differences between the ceramic and metal pieces.

In a first embodiment of the first intermediate piece, it is made of a layer of ductile metal material. Under such circumstances, the piece generally presents a solid structure in the form of a cushion of material suitable for deforming in shear. Amongst ductile materials that are suitable for being used, mention can be made of: nickel; palladium; gold; or alloys including these metals. For aviation applications that require refractory assemblies, it is advantageous to select nickel-based alloys, and in particular those presenting good behavior at high temperature and limited cost.

In a second embodiment of the first intermediate piece, said deformation is obtained by selecting a deformable structure for said piece. By way of example, this structure may be a spiral spring or a bellows. The piece then need not necessarily be made of ductile material. In order to guarantee good mechanical properties and good behavior at high temperature, the piece may be made of an alloy based on Ni or on Co.

The second intermediate piece seeks to protect said ceramic material piece chemically by preventing it being attacked by the brazing liquid used, which generally includes metals that react with SiC or with C. Thus, between the ceramic material piece and the metal pieces of the assembly, the second intermediate piece is interposed that is made of another ceramic material that reacts less with metals (and more particularly with transition metals), such as an oxide or a nitride.

Advantageously, the second intermediate piece presents rigidity and/or breaking strength greater than the ceramic material piece. The rigidity of the second intermediate piece serves to provide a rigid bearing surface for the first intermediate piece, thereby enabling it to deform, and serves to attenuate the mechanical stresses acting on the ceramic material piece. Its breaking strength serves to guarantee good mechanical behavior for the assembly. The second intermediate piece thus serves to protect the ceramic material piece mechanically given that such a piece is generally of a fragile nature.

Advantageously, the second intermediate piece presents a coefficient of expansion that is sufficiently close to that of the ceramic material piece to limit differences of expansion between these pieces.

Advantageously, given the mechanical and chemical conditions that need to be satisfied by the second intermediate piece, it is made of mullite (an oxide) or of aluminum nitride AlN (a nitride). Mullite is an aluminium silicate, a compound defined by the formula ($3Al_2O_3, 2SiO_2$) that can be obtained by heating silica in the presence of alumina. For aviation applications requiring refractory assemblies, mullite and AlN are particularly advantageous because of their good behavior at high temperature and their ability to withstand oxidation. In other applications, alumina ($Al_2O_3$) may be used.

Advantageously, the first brazing composition used for assembling together the first intermediate piece and the metal piece, and/or the first intermediate piece and the second intermediate piece, is based on Ni and includes an atomic percentage of Ti that is less than or about 10%. Preferably, this first composition also comprises the following elements: Fe; Cr; and Si. Brazing compositions comprising the following elements: Ni; Fe; Cr; Sr; and Ti; are written below as NiFeCrSiTi.

Various Ni-based brazing compositions that are said to be reactive (because they give rise to new intermetallic chemical compounds) are already known, but in the present circumstances the percentage of Ti needs to be limited since this element presents a high degree of reactivity relative to the second intermediate piece, which would lead to fragile intermetallic phases being produced.

Thus, said first brazing composition preferably comprises, in atomic percentages: 3% to 6% (preferably 3.5% to 5.5%) Ti when the second intermediate piece is made of AlN, and 6% to 10% Ti when the second intermediate piece is made of mullite.

Advantageously, the second brazing composition used for assembling together the second intermediate piece made of AlN or of mullite and the piece made of ceramic material based on SiC and/or on C, is an alloy based on Si.

In a first alternative, said second brazing composition essentially comprises, in atomic percentages: 60% to 97% silicon (Si) and 40% to 3% zirconium (Zr) and preferably it comprises a eutectic mixture of zirconium silicide $ZrSi_2$ and of Si.

The use of a $ZrSi_2$—Si mixture for brazing a piece made of a ceramic material based on SiC with a piece made of mullite, is known and described in document WO 03/037823.

The use of $ZrSi_2$—Si presents the following drawbacks: the liquidus temperature of a $ZrSi_2$—Si eutectic mixture is about 1370° C., which temperature is generally higher than the onset of melting temperature of the aviation metal alloys used for the metal piece and/or the first intermediate piece (by way of example, the onset-of-melting temperature of the "Hastelloy X" alloy, as described below, is 1310° C.).

To make the assembly of the invention, it is therefore necessary to perform two successive thermal cycles of raising and lowering temperature: a first cycle performed typically up to 1400° C. to assemble the ceramic material piece with the second intermediate piece; and a second cycle performed typically up to 1250° C., a temperature higher than the liquidus temperature of the first brazing composition, but at which said aviation metal alloys are not degraded. This second cycle makes it possible to achieve final assembly by assembling the metal pieces to each other, i.e. the base metal piece and the metal first intermediate piece, and assembling them with the ceramic material pieces, i.e. the second intermediate piece and the piece made of ceramic material based on SiC and/or C.

In a second alternative, the second brazing composition is essentially constituted by a mixture of praseodymium silicide ($PrSi_2$) and of Si, in which the silicon (Si) is in the majority and the praseodymium (Pr) is in the minority, in atomic percentages. Such a brazing composition is novel and can be used more generally for assembling two pieces together by brazing, one of the pieces being made of a ceramic based on SiC and/or on C, and the other piece being made of a ceramic based on SiC, on C, on AlN, or on mullite.

Advantageously, said mixture of $PrSi_2$ and of Si comprises, in atomic percentages: 78% to 97% Si; and 22% to 3% Pr, and preferably consists in a eutectic mixture of $PrSi_2$ and of Si.

When the atomic percentage of the mixture of $PrSi_2$ and of Si is close to the eutectic, i.e. about 81% to 85% Si and 19% to 15% Pr, the melting temperature of the $PrSi_2$—Si brazing composition is relatively low and assembly can be achieved by brazing together the pieces of the assembly in a single step.

It should be observed that the liquidus temperature of a eutectic mixture of $PrSi_2$ and of Si is about 1212° C., i.e. about 158° C. below the liquidus temperature of a eutectic mixture of $ZrSi_2$ and of Si.

When the atomic percentage of the mixture of $PrSi_2$ and of Si is not so close to the eutectic, in particular in the range 78% to 81% of Si and 22% to 19% of Pr, or in the range 85% to 97% of Si and 15% to 3% of Pr, then it is necessary to proceed in two steps, as described above, in order to avoid melting the metal pieces.

By using the $PrSi_2$—S brazing composition, it is possible to braze together all of the pieces of the assembly in a single step, at a temperature that is higher than the liquidus temperatures of said first and second brazing compositions, but that remains low enough to avoid degrading the alloys in question. The invention also provides a method of assembly using brazing with the help of such a composition.

BRIEF DESCRIPTION OF THE SEVERAL VIEWS OF THE DRAWINGS

The invention can be well understood and its advantages appear better on reading the following detailed description of an embodiment given by way of non-limiting example. The description refers to the accompanying drawings, in which.

DETAILED DESCRIPTION OF THE INVENTION

Figure 1:
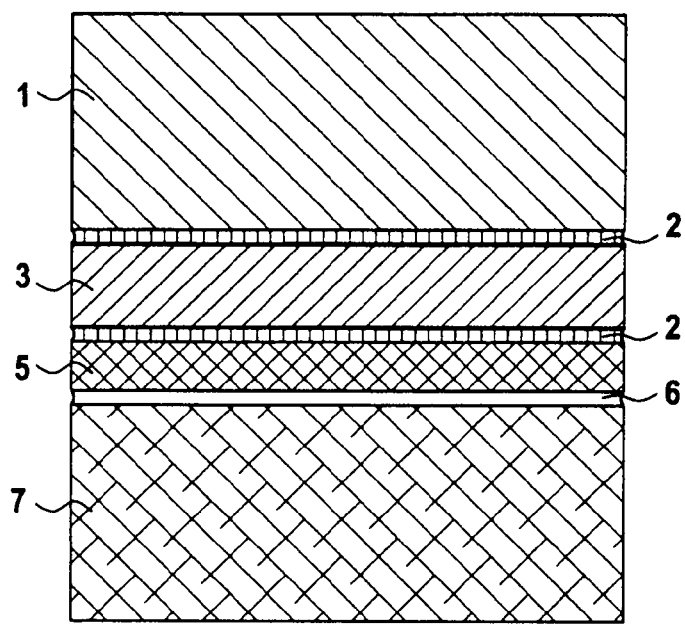
FIG. 1 is a diagrammatic view of an assembly in a first embodiment of the invention.

In a first example of an assembly of the invention, as shown in FIG. 1, the assembly comprises:

a metal piece 1 made of an Ni based alloy such as that sold under the registered trademark "Hastelloy x", comprising in percentages by weight: not more than 0.5% Al; not more than 0.008% B; 0.05% to 0.15% C; 20.5% to 23% Cr; 0.5% to 2.5% Co; not more than 0.5% Cu; 17% to 20% Fe; not more than 1% Mn; 8% to 10% Mo; not more than 0.04% P; not more than 1% Si; not more than 0.03% S; not more than 0.15% Ti; 0.2% to 1% W; with a balance of Ni;:

a first intermediate piece 3 made of an Ni-based alloy, e.g. an alloy sold under the registered trademark "Inconel 600", "Inconel 601", "Inconel 625", or "Nimonic 80A". An alloy of the "Inconel 625" typically comprises, in percentages by weight: not more than 0.4% Al; not more than 0.1% C; 20% to 23% Cr; not more than 0.1% Co; not more than 5% Fe; not more than 0.5% Mn; 8% to 10% Mo; 3.15% to 4.15% Nb; not more than 0.015% P; not more than 0.5% Si; not more than 0.015% S; not more than 0.4% Ti; with a balance of Ni;

a second intermediate piece 5 of AlN; and a ceramic matrix composite (CMC) piece 7, based on SiC.

The first brazing composition 2 used for brazing the metal piece 1 to the first intermediate piece 3 and for brazing the first intermediate piece 3 to the second intermediate piece 5 is of the NiFeCrSiTi type and comprises essentially (i.e. ignoring impurities), in percentages by weight: 2.8% Fe; 7% Cr; 6.2% Si; 4.5% Ti; with a balance of Ni.

The second brazing composition 6 used for brazing the second intermediate piece 5 to the ceramic material piece 7 is a eutectic mixture of $ZrSi_2$ and Si.

The method of assembling the metal and ceramic pieces 1 and 7 comprises two thermal cycles of raising and lowering temperature, and essentially comprises the following steps:
the second brazing composition 6 is placed on the surface for assembling together the ceramic material piece 7 and the second intermediate piece 5;
the assembly as formed in this way (pieces 5 and 7 and composition 6) is raised in temperature to above the liquidus temperature of the second brazing composition 6, and is then cooled;
the first brazing composition 2 is placed on the surfaces for assembling together of the first and second intermediate pieces 3 and 5 and of the metal piece 1; and
the new assembly as formed in this way (pieces 5, 7, 3, and 1, and compositions 2 and 6) is raised in temperature above the liquidus temperature of the first brazing composition 2, and is then cooled.

There follows a detailed example of such a method: the surfaces of the portions of the pieces 5 and 7 for assembling together, respectively made of AlN and of CMC, are degreased in an organic solvent, e.g. of the type comprising acetone, ester, ether, alcohol, or a mixture thereof. The surfaces of the portions of the pieces 7 and 5 are coated in a suspension of the second brazing composition 6, made of a eutectic mixture of $ZrSi_2$ and of Si. The portions in the vicinity of the CMC/AlN joint are covered in a so-called anti-wetting suspension that is not wettable by said composition. This suspension avoids any of the brazing composition running away from the CMC/AlN joint. The assembly as formed in this way, ready for brazing, is placed in an oven that is evacuated or under an atmosphere of inert gas. A first thermal cycle is typically performed with a temperature pause at 1400° C. for 5 minutes (min) to 10 min. This temperature is higher than the liquidus temperature of the brazing composition (at least 25° C. higher). The assembly is then cooled to ambient temperature at a rate of 5° C. per minute, for example. The CMC/AlN assembly is extracted from the oven. A continuous bead of brazing is observed between the CMC and the AlN. The assembly is cleaned with acetone and then with ethanol before the second brazing operation with the first intermediate piece 3 and the metal piece 1. The first intermediate piece 3 is of an Ni-based alloy of the "Inconel 625" type, and the metal piece 1 is made of an Ni-based alloy of the "Hastelloy X" type. The CMC piece 7, the bead of the second brazing composition 6, and the edges of the AlN piece 5 are covered in a so-called anti-wetting suspension, that is not wettable by the first brazing composition, which is of the NiFeCrSiTi type. The brazing composition is applied in the form of a tape on the AlN. The first intermediate piece 3 is placed on top of this tape of brazing composition. The piece 3 is then covered with a tape of brazing composition of the NiFeCrSiTi type and then with the metal piece 1. The edges of the pieces 1 and 3 can be coated in an anti-wetting suspension that is not wettable by the NiFeCrSiTi brazing composition. For the first intermediate piece 3, this anti-wetting coating depends on the shape of the piece. The assembly comprising CMC/$ZrSi_2$—Si brazing composition/AlN/NiFeCrSiTi brazing composition/Ni-based alloy/NiFeCrSiTi brazing composition/Ni-based alloy, ready for brazing, is placed in an oven that is evacuated or under an inert gas atmosphere. A second thermal cycle is performed with a pause at a temperature of 1100° C. for 30 min, followed by a second pause at 1250° C. for 15 min. This temperature of 1250° C. is higher than the liquidus temperature of the NiFeCrSiTi type brazing composition (at least 25° C. higher). The assembly is then cooled to ambient temperature at a rate of 5° C. per minute, for example.

In a second example of an assembly of the invention, the second brazing composition 6 used in the first example described above is replaced by a eutectic mixture of $PrSi_2$ and of Si. Under such circumstances, the method of assembling the metal and ceramic pieces 1 and 7 comprises a single thermal cycle of raising and lowering temperature, essentially comprising the following steps:
the second brazing composition 6 is placed on the surfaces to be assembled together of the ceramic material piece 1 and of the intermediate piece 5; and the first brazing composition 2 is placed on the surfaces for assembling together of the first and second intermediate pieces 3 and 5 and of the metal piece 1; and
the assembly as formed in this way (pieces 5, 7, 3, and 1, compositions 2 and 6) is raised in temperature to above the liquidus temperatures of the first and second brazing compositions 6 and 2, and then the assembly is cooled.

There follows a detailed example of such a method: the surfaces of the pieces 1, 3, 5, and 7 for assembling together are degreased in an organic solvent, e.g. of the type comprising acetone, ester, ether, alcohol, or a mixture thereof. The surfaces of the facing portions of the CMC and AlN pieces 7 and 5 are covered in carbon as is required to enable the surfaces to be thoroughly wetted by the brazing composition $PrSi_2$—Si. The carbon may be applied: 1) in the form of graphite powder, optionally mixed in an organic binder; or 2) by deposition techniques such as chemical vapor deposition (CVD) or physical vapor deposition (PVC); or else 3) merely by rubbing the surfaces with a graphite "lead" (e.g. pencil lead). The recommended thickness of carbon is about 1 micrometer (µm). Once the carbon layer has been applied to all of these surfaces, the suspension of the second brazing composition formed by the eutectic mixture $PrSi_2$—Si is placed between the CMC piece 7 and the AlN piece 5. The portions in the vicinity of the joint are covered in a so-called anti-wetting suspension that is not wettable by said composition. Said suspension avoids the brazing composition running away from the CMC/AlN joint. The AlN is covered in a brazing tape of the NiFeCrSiTi type. Above this brazing tape, the first intermediate piece 3 of Ni-based alloy is put into place. This piece 3 is then covered in a brazing tape of the NiFeCrSiTi type followed by the solid metal piece made of "Hastelloy X". The edges of the metal alloy pieces 1 and 3 may be coated in an anti-wetting suspension that is not wettable by the NiFeCrSiTi composition. For the first intermediate piece 3, this anti-wetting coating depends on the shape of the piece. The assembly comprising CMC/$PrSi_2$—Si brazing composition/AlN/NiFeCrSiTi brazing composition/Ni-based alloy/NiFeCrSiTi brazing composition/Ni-based alloy, ready for brazing, is placed in an oven under a vacuum (or under an inert gas atmosphere). A single thermal cycle is performed with a temperature pause at 1100° C. for 30 min, followed by a second pause at 1250° C. for 15 min. This temperature of 1250° C. is higher than the liquidus temperature of the NiFeCrSiTi type brazing composition and higher than the liquidus temperature of the second $PrSi_2$—Si brazing composition (at least 25° C. higher). The assembly is then cooled to ambient temperature at a rate of 5° C. per minute, for example.

In a third assembly example of the invention, the second intermediate piece of AlN brazed either with $ZrSi_2$—Si (in the first example) or with $PrSi_2$—Si (in the second example), is replaced by a piece 5 made of mullite.

In a fourth example of an assembly of the invention, the second intermediate piece of AlN in the above examples is replaced by a piece 5 made of mullite, and the face of this piece 5 that faces towards the piece 3 is metal-plated. This metal plating is performed with a brazing composition known under the trademark "TiCuSil", comprising the following percentages by weight, approximately: 68.8% Ag; 26.7% Cu; and 4.5% Ti. Another brazing composition based on Pd and Ni, preferably comprising in atom proportions, 35% to 55% Pd, and a balance of Ni (i.e. 50% to 69% Pd and 50% to 31% Ni in percentages by weight) can then be used for assembling together the first and second intermediate pieces 3 and 5 and also for assembling the metal piece with the first intermediate piece. In this example, the method of assembling the metal and ceramic pieces 1 and 7 comprises two thermal cycles and an additional metal-plating step between the first brazing of the ceramic material piece 7 with the second intermediate piece 5, and the complete brazing of the assembly.

In a fifth example of an assembly of the invention, the metal piece of Ni-based alloy used in the first example described above is replaced by a metal piece 1 of an alloy based on Co, e.g. the alloy known under the trademark "Haynes 188" and typically comprising, in percentages by weight: 20% to 24% Ni; 20% to 24% Cr; 13% to 15% W; not more than 3% Fe; 0.2% to 0.5% Si; not more than 1.25% Mn; 0.5% to 0.15% C; not more than 0.015% B; 0.02 to 0.12% La; with a balance of Co. The method of assembling the metal and ceramic pieces 1 and 7 then comprises two thermal cycles, with a first cycle of raising and lowering temperature having a pause at 1400° C. for 5 min to 10 min, and a second cycle having a pause at 1250° C. for 15 min.

In the above examples, the first intermediate piece 3 may present a solid structure as shown in FIG. 1. The piece 3 is then made of a material that is sufficiently ductile to deform and compensate for the difference in expansion between the metal and ceramic pieces. Naturally, the dimensions of this first intermediate piece 3, and in particular its thickness, need to be sufficient to ensure that the piece can perform its function. By way of example, for a ceramic material piece 7 and a metal piece 1 that are both circular cylinders, having a diameter of 10 millimeters (mm) and thickness of 5 mm, the first intermediate piece 3 is selected to have the shape of a circular cylinder with a diameter of 10 mm and a thickness of 2 mm, and the second intermediate piece is also selected to be in the form of a circular cylinder having a diameter of 10 mm, and thickness of 1 mm.

In another embodiment of the first intermediate piece 3, it is made with a structure that is deformable. Under such circumstances, this piece 3 is not necessarily made of a ductile alloy. By way of example, it is possible to make this piece 3 of an "Inconel 601" (registered trademark) alloy typically comprising, in percentages by weight: 1% to 1.7% Al; not more than 0.1% C; 21% to 25% Cr; not more than 1% Cu; not more than 1% Mn; 58% to 63% Ni; not more than 0.5% Si; not more than 0.015% S; and a balance of Fe.

Figure 2:
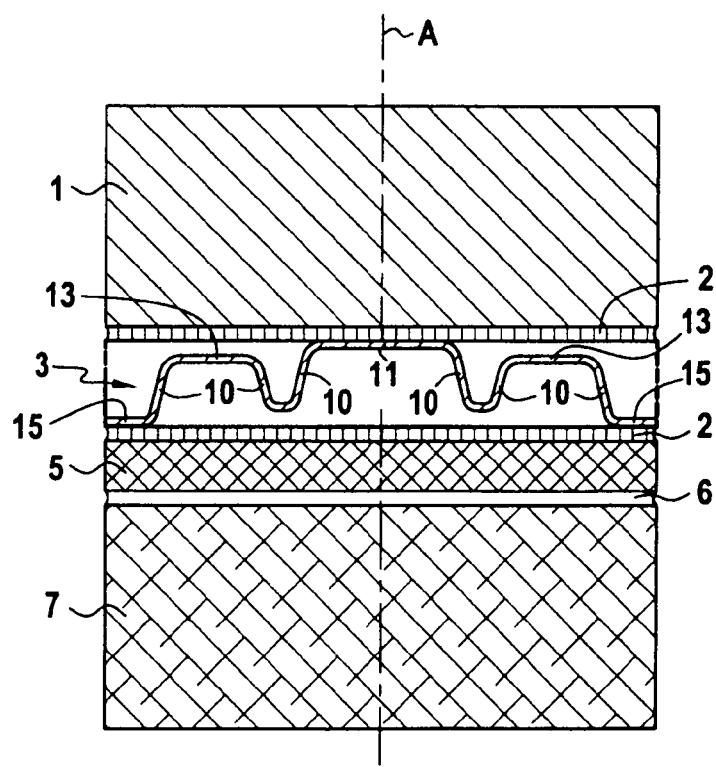
FIG. 2 is a diagrammatic view of an assembly in a second embodiment of the invention.

A first example of the first intermediate piece 3 having a deformable structure is shown in FIG. 2. This piece comprises a deformable sheet 3 having flat zones 11 and 15 that are brazed and sloping zones 10 that follow one another so as to form concentric undulations. The sheet 3 also has an inner flat zone 11 that is substantially circular about an axis A, an outer flat zone 15 that is substantially annular and coaxial about the inner zone 11, and with a diameter greater than the diameter of said inner zone, together with at least one intermediate annular flat zone 13 situated between the zones 11 and 15 and coaxial therewith. These zones 11, 13, and 15 are interconnected by sloping zones 10 that present symmetry of revolution about the axis A. The inner flat zone 11 is brazed to the metal piece 1 while the outer flat zone 15 is brazed to the second intermediate piece 5, or vice versa. The intermediate undulations (formed by the zones 10 and 13) remain free.

In another embodiment (not shown), the intermediate piece 3 is made up of a plurality of tapes folded to a concertina configuration and arranged radially around a preferably central fixed point. These tapes are arranged in a plurality of radial directions around said fixed point, thereby constituting an arrangement of concentric undulations.

Figure 3:
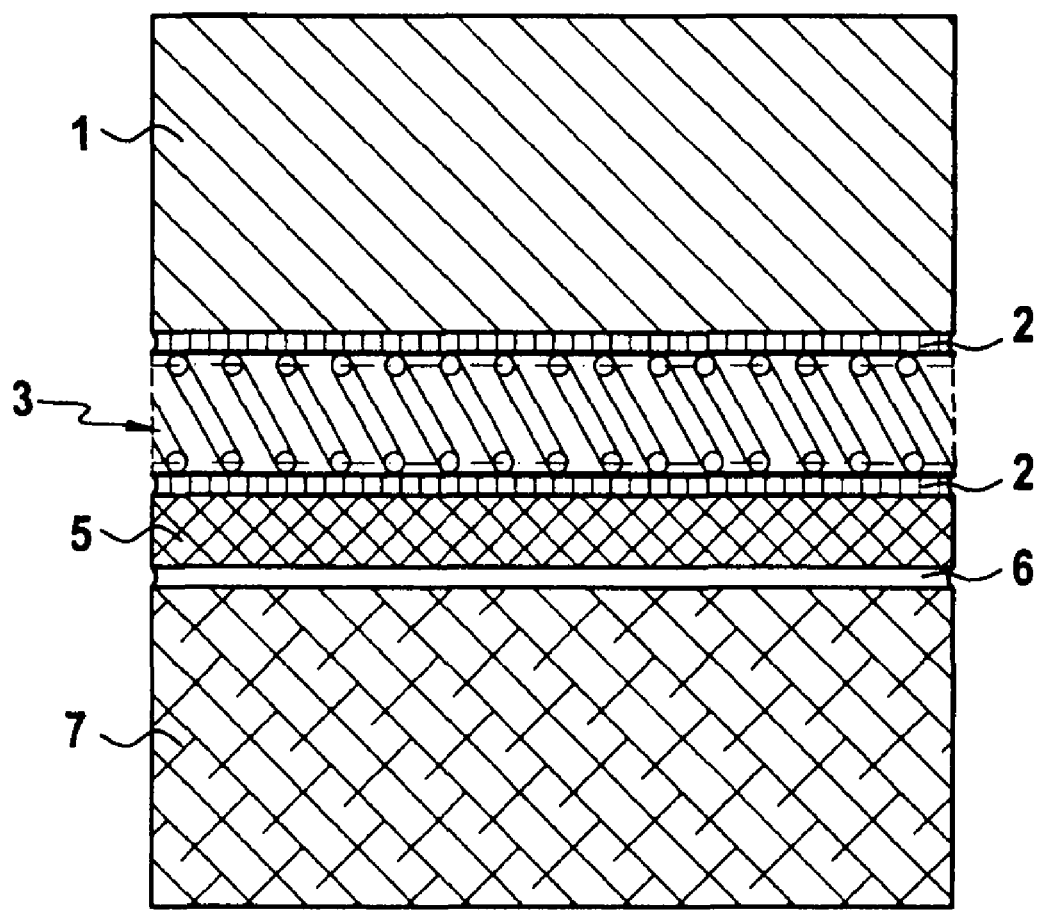
FIG. 3 is a diagrammatic view of an assembly in a third embodiment of the invention.

In another example shown in FIG. 3, the deformable structure is constituted by a plurality of pieces including a spiral spring 3 disposed in a circle having its main plane substantially parallel to the surfaces of the pieces 1 and 5 to be assembled together, such that these surfaces rest on the side faces of the spring. This structure may also include at least one spiral spring of rectilinear shape, disposed at the center of the circular spring 3 (not shown in FIG. 3), and of axis parallel to said surfaces.

The assembly of the invention can be used in a turbomachine, and more particularly in a turbojet.

Thus, the invention may relate to a turbomachine nozzle including at least one assembly as described above, in which the metal piece is a casing or a lever of the nozzle, and the ceramic material piece is a flap of the nozzle.

The invention also relates to a turbomachine combustion chamber comprising at least one assembly as described above, in which the metal piece is a casing, a gasket, or more generally, a component part of the chamber, and said ceramic material piece is another component part of the chamber.

The invention also relates to post-combustion equipment for a turbomachine, the equipment including at least one assembly as described above, in which the metal piece is a post-combustion casing or a platform, and the ceramic material piece is a flame-holder arm.

The invention claimed is:

1. An assembly between a metal piece and a ceramic material piece made of a SiC and/or C based ceramic material, the assembly comprising:
    a stack structure comprising the following elements assembled together in pairs in this order, by brazing:
    said metal piece;
    a first intermediate piece;
    a second intermediate piece that is made of AlN or of mullite, and that presents a coefficient of expansion smaller than that of the material constituting said metal piece; and
    said ceramic material piece,
    wherein the first intermediate piece is made of metal and is suitable for deforming to compensate for expansion difference between the metal piece and the second intermediate piece.

2. An assembly according to claim 1, wherein the second intermediate piece presents rigidity and/or breaking strength greater than that of the ceramic material piece.

3. An assembly according to claim 1, wherein the ceramic material piece is made of solid SiC.

4. An assembly according to claim 1, wherein the ceramic material piece is made of ceramic matrix composite material.

5. An assembly according to claim 4, wherein the composite material comprises a matrix based on SiC and/or C, reinforced by fibers of SiC and/or C.

6. An assembly according to claim 1, wherein the metal piece is made of an alloy based on Ni or based on Co.

7. An assembly according to claim 1, wherein the first intermediate piece is made of Ni or of an alloy based on Ni, or of Co, or of an alloy based on Co.

8. An assembly according to claim 1, wherein a first brazing composition is used for assembling the first intermediate piece to the metal piece, and/or to the second intermediate piece, the first composition being based on Ni and including an atomic percentage of Ti less than or approximately 10%, with the first composition including the following elements: Fe, Cr, and Si.

9. An assembly according to claim 8, wherein the first brazing composition comprises, in atomic percentages: 3% to 6% Ti when the second intermediate piece is made of AlN; and 6% to 10% Ti when the second intermediate piece is made of mullite.

10. An assembly according to claim 1, wherein a first brazing composition is used for assembling the first intermediate piece to the metal piece and/or to the second intermediate piece, the first composition being based on Pd and Ni.

11. An assembly according to claim 1, wherein a second brazing composition is used for assembling the second intermediate piece made of AlN or of mullite to the ceramic material piece based on SiC and/or C, the second composition being based on Si.

12. An assembly according to claim 11, wherein the second brazing composition essentially comprises, in atomic percentages: 60% to 97% Si, and 40% to 3% Zr, and includes an eutectic mixture of $ZrSi_2$ and of Si.

13. An assembly according to claim 11, wherein the second brazing composition essentially comprises, in atomic percentages: 78% to 97% Si;
and 22% to 3% Pr; and includes an eutectic mixture of $PrSi_2$ and of Si.

14. An assembly according to claim 1, wherein the first intermediate piece comprises a layer of ductile metal material.

15. An assembly according to claim 1, wherein the first intermediate piece comprises a deformable structure.

16. An assembly according to claim 15, wherein the deformable structure includes a deformable sheet presenting deformable zones, in a form of concentric undulations, together with flat zones that are brazed.

17. A method of making an assembly according to claim 1, comprising:
brazing together the ceramic piece and the second intermediate piece with help of a second brazing composition; and
brazing together the second intermediate piece, the first intermediate piece, and the metal piece are with help of a first brazing composition having a melting temperature lower than that of the second brazing composition.

18. A method of making an assembly according to claim 1, wherein the ceramic piece, the second intermediate piece, the first intermediate piece, and the metal piece are brazed together in a single operation.

19. A turbomachine comprising at least one assembly according to claim 1.

20. A turbomachine according to claim 19, further comprising a nozzle including the at least one assembly, in which the metal piece is a casing or a lever of the nozzle, and the ceramic material piece is a flap of the nozzle.

21. A turbomachine according to claim 19, further comprising a combustion chamber including the at least one assembly, in which the metal piece is a casing, a gasket, or a component part of the combustion chamber, and the ceramic material piece is another component part of the combustion chamber.

22. A turbomachine according to claim 19, further comprising a post-combustion equipment including the at least one assembly, in which the metal piece is a post-combustion casing or a platform, and the ceramic material piece is a flame-holder arm.

23. A brazing composition for assembling two pieces together by brazing, one of the pieces being made of a ceramic based on SiC and/or on C, and the other piece being made of a ceramic based on SiC, on C, on AlN, or on mullite, the composition being essentially constituted by a mixture of $PrSi_2$ and of Si, in which Si is in the majority and Pr in the minority, in atomic percentages.

24. A brazing composition according to claim 23, wherein the mixture of $PrSi_2$ and of Si comprises, in atomic percentages: 78% to 97% Si; and 22% to 3% Pr; and includes an eutectic mixture of $PrSi_2$ and of Si.

* * * * *

UNITED STATES PATENT AND TRADEMARK OFFICE
CERTIFICATE OF CORRECTION

PATENT NO. : 8,177,497 B2  
APPLICATION NO. : 12/096663  
DATED : May 15, 2012  
INVENTOR(S) : Joel Michel Benoit et al.

Page 1 of 1

It is certified that error appears in the above-identified patent and that said Letters Patent is hereby corrected as shown below:

On the title page, Item (73), the second Assignee's name is incorrect. Item (73) should read:

--(73) Assignees: SNECMA, Paris (FR); Commissariat a l'Energie Atomique, Paris (FR); Institut National Polytechnique de Grenoble, Grenoble (FR)--

Signed and Sealed this

Seventeenth Day of July, 2012

David J. Kappos
*Director of the United States Patent and Trademark Office*